United States Patent
Tanaka et al.

(10) Patent No.: US 9,411,115 B2
(45) Date of Patent: Aug. 9, 2016

(54) OPTICAL FIBER RIBBON

(71) Applicant: Furukawa Electric Co., Ltd., Tokyo (JP)

(72) Inventors: Hiroki Tanaka, Tokyo (JP); Minoru Saito, Tokyo (JP); Hirotaka Watanabe, Tokyo (JP); Hiroaki Ito, Tokyo (JP); Yukio Ishii, Tokyo (JP); Yoshihiro Arashitani, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/704,503

(22) Filed: May 5, 2015

(65) Prior Publication Data

US 2015/0234140 A1 Aug. 20, 2015

Related U.S. Application Data

(63) Continuation of application No. PCT/JP2013/006388, filed on Oct. 29, 2013.

(30) Foreign Application Priority Data

Nov. 5, 2012 (JP) .................................. 2012-243613

(51) Int. Cl.
G02B 6/44 (2006.01)
(52) U.S. Cl.
CPC .............. G02B 6/443 (2013.01); G02B 6/4403 (2013.01)
(58) Field of Classification Search
None
See application file for complete search history.

(56) References Cited

U.S. PATENT DOCUMENTS

| | | | | |
|---|---|---|---|---|
| 2003/0119934 A1* | 6/2003 | Hu | ........................ | C03C 25/106 522/90 |
| 2004/0146255 A1* | 7/2004 | Ishikawa | .............. | G02B 6/4403 385/114 |
| 2005/0228063 A1* | 10/2005 | Komiya | .............. | C03C 25/1055 522/96 |
| 2008/0181565 A1* | 7/2008 | Arashitani | ............... | G02B 6/14 385/114 |
| 2008/0241535 A1* | 10/2008 | Cattron | ............... | C03C 25/1065 428/392 |
| 2014/0226941 A1* | 8/2014 | Tanaka | ................. | G02B 6/4482 385/114 |

FOREIGN PATENT DOCUMENTS

| | | |
|---|---|---|
| JP | 2005-513237 A | 5/2005 |
| JP | 2007-272060 A | 10/2007 |
| JP | 4630210 B2 | 2/2011 |
| JP | 2011-158580 A | 8/2011 |
| JP | 2011-158581 A | 8/2011 |

* cited by examiner

*Primary Examiner* — Michelle R Connelly
(74) *Attorney, Agent, or Firm* — Oblon, McClelland, Maier & Neustadt, L.L.P

(57) ABSTRACT

An optical fiber ribbon according to the present invention includes a collective coating layer containing an ultraviolet curable resin containing amorphous PPG and an amorphous monomer, the collective coating layer formed around coated optical fibers. The collective coating layer has an equilibrium elastic modulus of 12 MPa to 20 MPa, both inclusive, and a yield point elongation of 5% to 9%, both inclusive, and the adhesion between the collective coating layer and the outermost layers of the coated optical fibers is 12 N/cm to 15 N/cm, both inclusive.

2 Claims, 3 Drawing Sheets

OPTICAL FIBER RIBBON

CROSS-REFERENCES TO RELATED APPLICATIONS

This application is a continuation application of International Application No. PCT/JP2013/006388, filed Oct. 29, 2013, which claims the benefit of Japanese Patent Application No. 2012-243613, filed Nov. 5, 2012. The contents of the aforementioned applications are incorporated herein by reference in their entireties.

TECHNICAL FIELD

The present invention relates to an optical fiber, and particularly relates to an optical fiber ribbon in which multiple coated optical fibers are integrated in the form of a ribbon.

BACKGROUND ART

With a demand for high speed communications in the Internet and corporate networks, use of optical fiber cables has been spreading rapidly.

The optical fiber is made of quartz glass, and accordingly is quite vulnerable to an external force and an external environment. For this reason, a protective coating layer generally coats the circumference of an optical fiber to protect the optical fiber from the external force and the external environment. The optical fiber thus coated with the protective coating layer is called a coated optical fiber. Then, an optical fiber ribbon in the form of a ribbon is formed in such a way that multiple optical fibers are arrayed and an ultraviolet curable resin coats the circumference of the coated optical fibers.

An installation of an optical fiber ribbon thus formed requires work to take out the coated optical fibers by separating the protective coating layer from the optical fiber ribbon. The separability of the protective coating layer from the optical fiber ribbon has a large influence on working efficiency in handling the optical fiber ribbon. For this reason, one of approaches having been taken so far is to evaluate an optical fiber ribbon by using single core separability as an indicator indicating how easy the protective coating layer can be separated from the coated optical fibers (for example, see Patent Document 1). The single core separability of an optical fiber ribbon is determined by an adhesion between a ribbon material and outermost layers of coated optical fibers. If the single core separability is excessively good, in other words, the adhesion is excessively weak, the ribbon material layer and the outermost layers may be separated from each other when soaked in water. Such separation may increase a transmission loss of the optical fibers. On the other hand, if the single core separability is excessively bad, in other words, the adhesion is excessively strong, an installation operation requires a long time for single core separation work, and consequently is lowered in working efficiency.

As material development for protective coating layers of optical fibers has been advancing, the material characteristics thereof have been improved. With this improvement, the demand for improvement of ribbon material characteristics has become increasingly strong. In this regard, single core separability of the optical fiber ribbon largely depends on the characteristics of a ribbon material used in the optical fiber ribbon. An ultraviolet curable type of urethane acrylate resin generally used as a ribbon material for an optical fiber ribbon contains a polyol component having a long chain part as a skeleton component. The ribbon material is composed through reaction of this polyol component with an isocyanate component, a reactive oligomer containing hydroxyacrylate having an unsaturated double bond, a reactive multifunctional and/or reactive monofunctional acrylate monomer also having an unsaturated double bond, a vinyl monomer, a photopolymerization initiator, and two or more additives. With the thus composed ribbon material irradiated with ultraviolet rays, the photopolymerization initiator generates radicals and the unsaturated double bonds of the oligomer and the monomer are cross-linked. As the polyol component of the oligomer, there can be cited polypropylene glycol, an ethylene oxide-butadiene oxide copolymer, and polytetramethylene glycol. Among them, the polytetramethylene glycol (hereinafter, abbreviated as "PTMG") has high thermal resistance, and is also excellent in mechanical strength, elongation characteristics, and toughness. Thus, the PTMG is widely used as a ribbon material.

CITATION LIST

Patent Document

Patent Document 1: Japanese Patent No. 4630210

SUMMARY OF INVENTION

Technical Problem

However, the PTMG has a melting point at around 20° C., and has a linear chain molecular structure. For these reasons, the PTMG has a problem in that the PTMG more easily crystallizes at a low temperature than other polyethers. Accordingly, the PTMG crystallizes during storage in an environment at a temperature equal to or below the melting point. Hence, in a drawing operation and a collective coating operation, a ribbon coat resin needs to be heated to a temperature equal to or above the melting point once, and to be melted. This significantly lowers the workability.

In addition, the PTMG is not involved in an ultraviolet curing reaction. In the case of a collective coating layer containing unreacted PTMG, the PTMG remains unreacted in the cured coating layer even after the formation of the cured coating layer with ultraviolet irradiation. If an optical fiber in which a certain or more amount of a crystalline substance such as PTMG remains in the coating layer is exposed in a low temperature environment for a long period, the crystalline substance may crystallize and precipitate in the coating layer. This may significantly increase the transmission loss of the optical fibers.

Provided with a side chain, a PTMG oligomer can be made less likely to aggregate or crystallize, but still cannot avoid crystallization completely. To address this, amorphous polypropylene glycol (hereinafter, PPG) or the like may be used as the oligomer in place of the PTMG. This composition may inhibit crystallization of the monomer in a use environment. However, the PPG is poorer in mechanical characteristics and toughness than the PTMG, and accordingly has a problem, for example, in that a ribbon material tends to be easily broken in an operation of single core separation. Moreover, some monomers such as lauryl acrylate (melting point: −8° C.) or vinyl caprolactam (melting point: 35° C.), for example, may crystallize at a temperature under a use environment. In general, a colorant having a high crosslink density is arranged below a ribbon layer, and blocks a transfer of a crystalline component to the inside of the optical fiber. However, there still remains a concern about an influence of the crystallization of the monomer on the transmission characteristics of the optical fiber. Hence, by using a material such as amorphous PPG, it has been difficult to provide an optical fiber ribbon which has favorable single core separability for working efficiency improvement, and satisfies water resistance for avoiding the occurrence of inter-layer separation.

The present invention has been made in view of the foregoing problems, and an objective of the present invention is to provide an optical fiber ribbon in which a ribbon material is produced by employing amorphous PPG and an amorphous monomer to be surely prevented from crystallizing under a use environment, and in which various characteristics of the ribbon material are adjusted to control the toughness which is insufficient in the PPG, thereby enabling the optical fiber ribbon to achieve single core separability and water resistance for inhibiting inter-layer separation, which are comparable to those achievable by PTMG.

Solution to Problem

As a result of study on a mechanism of single core separation in order to improve the toughness which is a problem of PPG, an attention was paid to a yield point in elastic deformation and an adhesion of a ribbon material in the process of peeling the material off. The intensive study on them resulted in findings that if a ribbon material is formed while being controlled in an elongation length under a stress at a yield point, an equilibrium elastic modulus, and an adhesion, the ribbon material can be separated without being broken in a single core separation process. In addition, as for the problem of water soaking, it was found that the water resistance is favorable.

To attain the foregoing objective, an optical fiber ribbon according to the present invention includes a collective coating layer containing an ultraviolet curable resin containing amorphous PPG and an amorphous monomer, the collective coating layer formed around coated optical fibers. The collective coating layer has an equilibrium elastic modulus of 12 MPa to 20 MPa, both inclusive, and a yield point elongation of 5% to 9%, both inclusive, and an adhesion between the collective coating layer and outermost layers of the coated optical fibers is 12 N/cm to 15 N/cm, both inclusive.

In addition, in the optical fiber ribbon of the present invention, the PPG preferably has a number average molecular weight of 500 to 10000. Moreover, in the optical fiber ribbon of the present invention, the equilibrium elastic modulus, the yield point elongation, and the adhesion of the collective coating layer can be optimized by adjusting the number average molecular weight of the PPG. Further, in the optical fiber ribbon of the present invention, the ultraviolet curable resin may further contain an amorphous monofunctional monomer and/or multifunctional monomer as an additive(s). Furthermore, in the optical fiber ribbon of the present invention, the equilibrium elastic modulus, the yield point elongation, and the adhesion of the collective coating layer can be optimized by adjusting a ratio of functional groups in the monofunctional monomer and/or the multifunctional monomer.

Advantageous Effects of Invention

According to the present invention, amorphous PPG is used for a collective coating layer containing an ultraviolet curable resin, and the molecular weight of the PPG and the ratio of functional groups in an amorphous monomer contained in the ultraviolet curable resin are adjusted. This enables the optical fiber ribbon to offer favorable workability with which the ribbon material will not be broken in a process of single core separation in the optical fiber ribbon. Furthermore, even in an environment with soaking in hot water, the optical fiber ribbon can achieve favorable water resistance without causing inter-layer separation. In addition, the crystallization of the ribbon material can be inhibited completely under a use environment.

DESCRIPTION OF EMBODIMENTS

Figure 1:
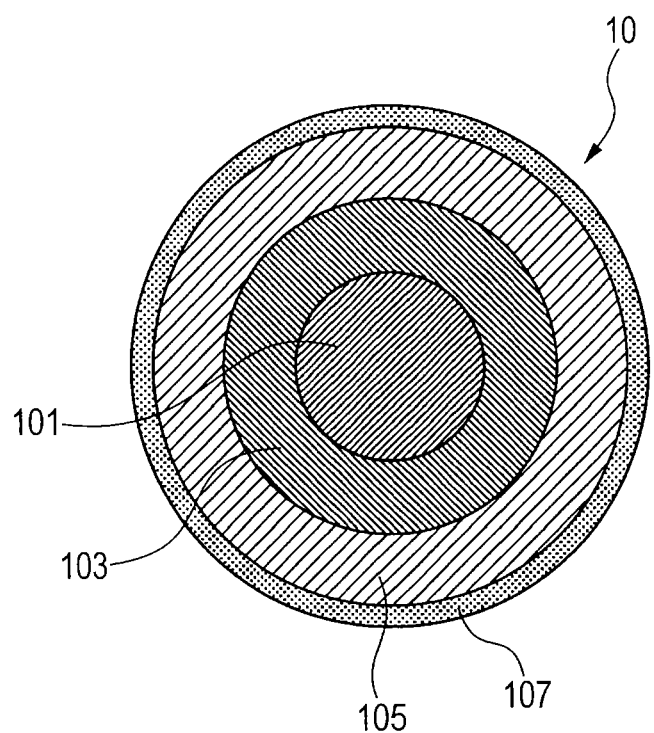
FIG. 1 is a cross sectional view of a colored coated optical fiber according to an embodiment of the present invention.

Hereinafter, an embodiment of the present invention is described with reference to the drawings. It should be noted that the present invention is not limited to the following embodiment. In addition, in the drawings described below, elements having the same function are denoted by the same reference numeral, and some part of the repetitive explanation thereof may be omitted.

FIG. 1 is a cross sectional view of a colored coated optical fiber 10 according to an embodiment of the present invention. The colored coated optical fiber 10 includes a glass optical fiber 101, a primary layer 103, a secondary layer 105, and a colored layer 107. The glass optical fiber 101 is made of quartz glass, and the primary layer 103 and the secondary layer 105 are formed in this order on the circumference of the glass optical fiber 101. The primary layer 103 and the secondary layer 105 are each made of an ultraviolet curable resin. The colored layer 107 is formed around the secondary layer 105. The colored layer 107 is made of an epoxy acrylate-based resin. These ultraviolet curable resins each contain an oligomer, a monomer as a diluent, a photoinitiator, a chain transfer agent, and an additive. Multiple kinds of optical fibers can be obtained with these constituent materials changed to different ones. The glass optical fiber 101, the primary layer 103, and the secondary layer 105 preferably have outer diameters of 125 µm, 185 µm or 195 µm, and 245 µm, respectively, and the colored coated optical fiber 10 has an outer diameter of 255 µm.

Figure 2:
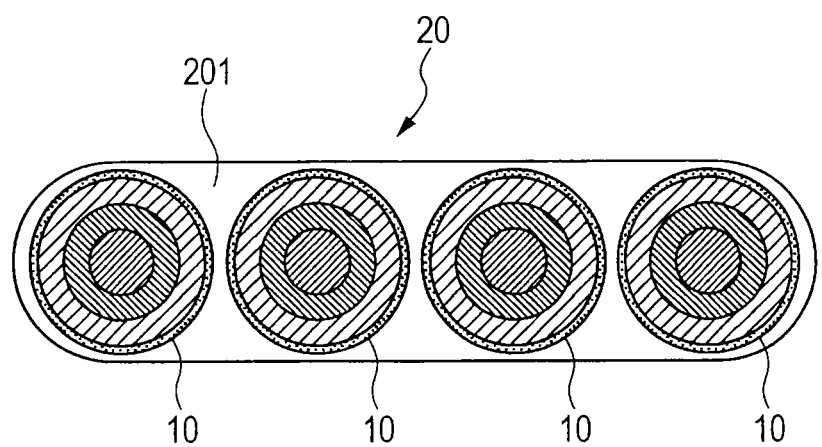
FIG. 2 is a cross sectional view of an optical fiber according to the embodiment of the present invention.

FIG. 2 is a cross sectional view of an optical fiber ribbon 20 according to the embodiment of the present invention. The optical fiber ribbon 20 includes four colored coated optical fibers 10, and a collective coating layer 201. Specifically, the four colored coated optical fibers 10 are arranged side by side, and these colored coated optical fibers 10 are coated with the collective coating layer 201. The collective coating layer 201 is formed of a ribbon resin made of an ultraviolet curable resin. Here, the number of the colored coated optical fibers 10 is not limited to four, but may be any number such as 8 or 12. In the present embodiment, the coated optical fiber 20 preferably has a thickness of 0.30 mm.

Polypropylene glycol (PPG) is used as a polyol component of an oligomer used in the collective coating layer 201. Since the PPG is amorphous, it is possible to completely avoid a problem of polytetramethylene glycol (PTMG) conventionally used, i.e., a tremendous increase in the transmission loss of the optical fibers due to crystallization of PTMG under a low temperature environment. The number average molecular weight of PPG is preferably 500 to 10000, more preferably 1000 to 8000, and particularly preferably 2000 to 4000.

As the polyol component of the oligomer used in the collective coating layer 201, the PPG has a molecular structure, both ends of which are provided with polyether urethane-based oligomers as isocyanates. The polyether urethane-based oligomer is composed of a hydroxy acrylate having an ethylenic unsaturated group bonded via tolylene diisocyanate, isophorone diisocyanate, or the like.

The thus composed oligomer used in the collective coating layer 201 is further combined with a reactive multifunctional and/or reactive monofunctional acrylate monomer or vinyl monomer having an unsaturated double bond as a reaction diluent, a photopolymerization initiator, and various additives. As a result of the combining, the collective coating layer 201 is formed as an ultraviolet curable resin.

The material characteristics of the collective coating layer 201 can be adjusted as needed by selection of a polyol material to serve as the skeleton component of the collective coating layer 201, and the molecular weight of the material, as well as by selection of a monomer material to be added in the process of producing the collective coating layer 201 and an amount of the material added. For example, a decrease in the molecular weight of the PPG used in the present embodiment or an increase of functional groups in a monomer to be combined can bring about increases in the Young's modulus, the glass transition temperature, and the equilibrium elastic modulus of the collective coating layer 201. Conversely, an increase in the molecular weight of the PPG used in the present embodiment or a decrease of functional groups in a monomer to be combined can bring about decreases in the Young's modulus, the glass transition temperature, and the equilibrium elastic modulus of the collective coating layer 201.

As a monomer to be added in the process of producing the collective coating layer 201, examples of a monofunctional monomer include PO-modified nonylphenol acrylate, isobornyl acrylate, 2-ethylhexyl acrylate, isononyl acrylate, isodecyl acrylate, polyethylene glycol acrylate, N-vinyl pyrrolidone, N-vinyl caprolactam and the like. Moreover, examples of a bifunctional monomer and a multifunctional monomer include 1-6-hexane diacrylate, bisphenol A epoxy acrylate, tripropylene glycol diacrylate, dimethylol tricyclodecane diacrylate, and the like. Here, the monofunctional monomer produces a larger effect of decreasing the equilibrium elastic modulus than the bifunctional monomer and the multifunctional monomer. This is because the monofunctional monomer acts to more significantly reduce the number of crosslinking points in the molecular structure of the collective coating layer 201 than the bifunctional monomer and the multifunctional monomer.

In the present embodiment, the equilibrium elastic modulus and the yield point elongation of the collective coating layer 201, and the adhesion between the collective coating layer 201 and the colored layer 107 are optimized by adjusting the molecular weight of the PPG and the monomer as the additive. This optimization makes it possible to achieve favorable single core separability comparable to that obtained from the conventionally used PTMG, and to ensure excellent workability without having inter-layer separation in the processing of the optical fiber ribbon 20. In particular, according to the present embodiment, elongation and toughness characteristics of the collective coating layer 201 as the ribbon material can be improved by selecting an amorphous material as a monomer to be added, and further by increasing the ratio of functional groups in the monomer.

Hereinafter, description is provided for a method of measuring material characteristics of the optical fiber ribbon 20 according to the embodiment of the present invention, and the measurement results. As samples used for the measurement, fabricated were four kinds of colored coated optical fibers 10 coated with four kinds of colored layers (C1, C2, C3, and C4) made of different materials, respectively. The purpose for this variation is to check whether or not the characteristics at an interface between the collective coating layer 201 and the colored layer 107 depend on the material of the colored layer 107. Four colored coated optical fibers 10 of each kind thus fabricated were arranged side by side. Thereafter, the colored coated optical fibers 10 thus arranged were coated with the collective coating layer 201 containing the PPG to fabricate each of four kinds of optical fiber ribbons 20.

Figure 3:
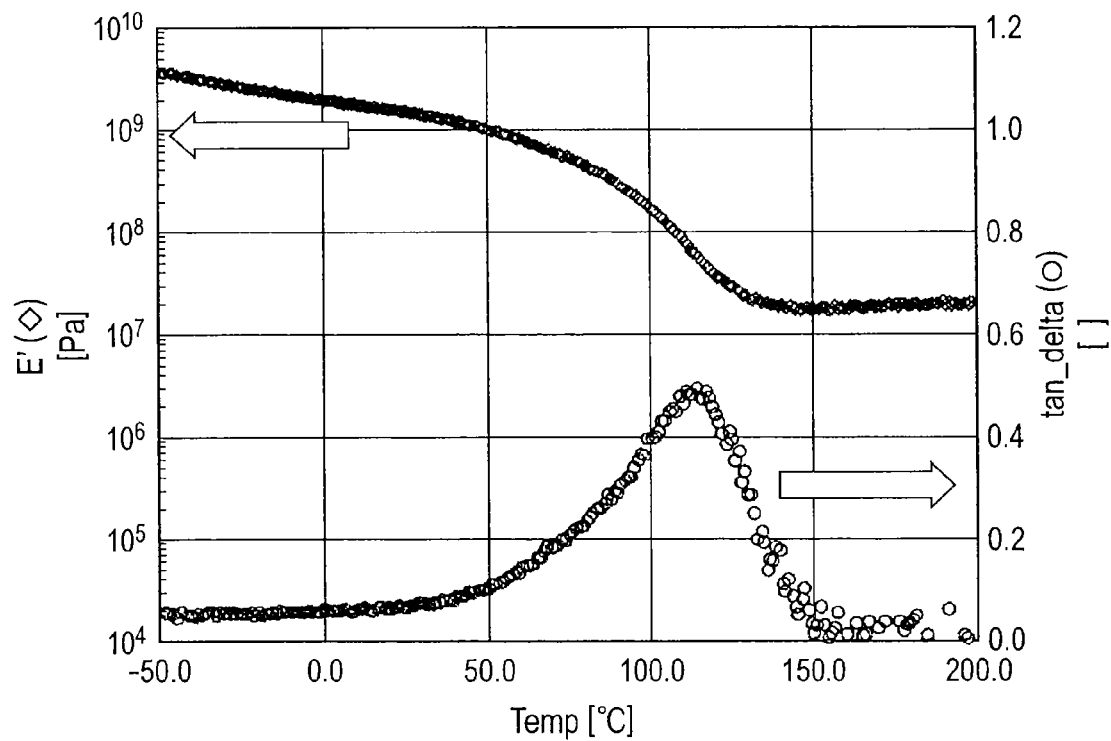
FIG. 3 is a diagram presenting examples of measurement results of an equilibrium elastic modulus and a glass transition temperature of a collective coating layer used to fabricate the optical fiber ribbon according to the embodiment of the present invention.

To begin with, an equilibrium elastic modulus and a glass transition temperature of the collective coating layer 201 were measured. FIG. 3 is a diagram presenting examples of the measurement results of the equilibrium elastic modulus and the glass transition temperature of the collective coating layer 201 used to fabricate the optical fiber ribbon 20 according to the embodiment of the present invention. The sample used in the measurement was formed by slicing the collective coating layer 201 along its longitudinal direction with a single-edged tool. A glass transition temperature Tg was measured in a dynamic mechanical analysis (DMA) using RSA3 sold by TA Instruments. In this measurement, the glass transition temperature Tg is defined as a temperature at which a tan δ which is a measured value reaches its maximum value. In addition, the equilibrium elastic modulus was measured in a tensile testing using a sample similar to the sample used in the measurement of the glass transition temperature. The measurement conditions were set to a gauge length of 20 mm, a frequency of 1 Hz, and a rate of temperature rise of 3° C./rain. The measurement for the equilibrium elastic modulus was made within a temperature range from −100° C. to 200° C., and the lowest measured value within this temperature range was determined as the equilibrium elastic modulus.

Next, a Young's modulus in tension of the collective coating layer 201 was measured by using a sliced sample similar to those used in the measurements of the equilibrium elastic modulus and the glass transition temperature illustrated in FIG. 3. The measurement used a tensilon universal testing machine. In this measurement method, an end of the sample was first bonded to an aluminum plate, the aluminum plate was chucked by the testing machine, and then the sample was extended at a gauge length of 25 mm and a tensile speed of 1 mm/min. Then, a stress applied when the sample was elongated by 2.5% was measured, and the Young's modulus in tension was calculated based on the stress value and the elongated length. The measurement was made under an environment at a temperature of 23° C. and a humidity of 55% RH.

Further, a yield point elongation of the collective coating layer 201 was measured by using a sliced sample similar to that used in the measurement of the Young's modulus in tension. This measurement also used the tensilon universal testing machine as in the measurement of the Young's modulus in tension. In this measurement method, an end of the sample was first bonded to an aluminum plate, the aluminum plate was chucked by the testing machine, and then the sample was extended at a gauge length of 25 mm and a tensile speed of 50 mm/min. Then, the elongated length of the sample was measured when the stress applied to the sample reached a yield point at which the sample was transitioned from an elastically deformed state to a plastically deformed state. Then, the measured elongated length was determined as the yield point elongation.

Figure 4:
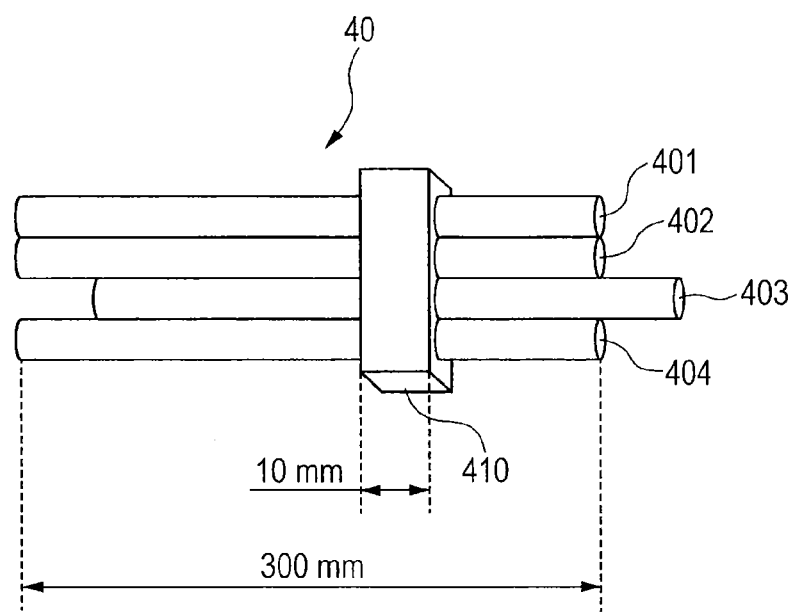
FIG. 4 is a schematic drawing illustrating a sample for use to measure an adhesion between the collective coating layer used to fabricate the optical fiber ribbon according to the embodiment of the present invention, and a colored layer.

Subsequently, an adhesion between the collective coating layer 201 and the colored layer 107 was measured. FIG. 4 is a schematic drawing illustrating a sample 40 for use to measure the adhesion between the collective coating layer 201 used to fabricate the optical fiber ribbon 20 according to the embodiment of the present invention, and the colored layer 107. As illustrated in FIG. 4, the sample 40 includes four colored coated optical fibers 401, 402, 403, and 404 and a partial collective coating layer 410.

The following description is provided for an example of a procedure of fabricating the sample 40 illustrated in FIG. 4. First, in the optical fiber ribbon 20 having a length of 300 mm, the partial collective coating layer 410 having a length of 10 mm was kept remaining while the rest of the collective coating layer is removed entirely. Next, among the exposed four colored coated optical fibers 401 to 404, the third colored coated optical fiber 403 was drawn out. As a result, a sample was fabricated in which only the third colored coated optical fiber 403 was drawn out at one end of the optical fiber ribbon 20 as illustrated in FIG. 4.

Figure 5:
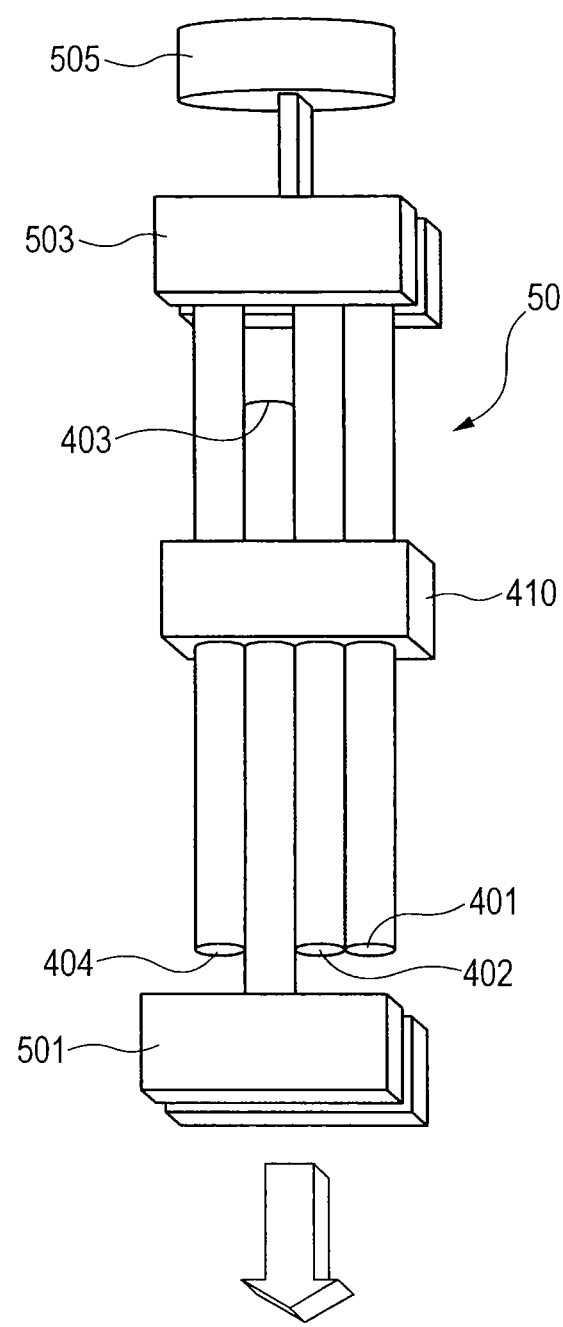
FIG. 5 is a schematic drawing illustrating a method of measuring an adhesion between the collective coating layer used to fabricate the optical fiber ribbon according to the embodiment of the present invention, and the colored layer.

Using the sample illustrated in FIG. 4, the adhesion between the collective coating layer 201 and the colored layer 107 was measured. FIG. 5 is a schematic drawing illustrating a method of measuring the adhesion between the collective coating layer 201 used to fabricate the optical fiber ribbon 20 according to the embodiment of the present invention, and the colored layer 107. At the one end of the sample illustrated in FIG. 4, the third colored coated optical fiber 403 was drawn out, and the drawn-out colored coated optical fiber 403 was chucked by a lower chuck 501 of a tensile testing machine. Meanwhile, at the other end of the sample, the three colored coated optical fibers 401, 402, and 404 were chucked all together by an upper chuck 503 of the tensile testing machine. Then, the lower chuck 501 of the tensile testing machine was moved downward to completely pull out the third colored coated optical fiber 403 from the partial collective coating layer 410. The tensile speed of the lower chuck 501 for pulling out was set to 10 mm/min. In this process, a force generated in pulling out the third colored coated optical fiber 403 from the partial collective coating layer 410 was measured by a load cell 505 installed above the upper chuck 503. A value was calculated in such a way that the maximum value of the force measured by the load cell 505 was divided by a length of the pulled-out portion of the third colored coated optical fiber 403, and the value thus calculated was determined as the adhesion between the collective coating layer 201 and the colored layer 107.

Then, the single core separability of the optical fiber ribbon 20 fabricated as illustrated in FIG. 2 was evaluated. The single core separability is a property which has a large influence on the workability in an installation. For this reason, a sensory testing based on an actual installation operation was conducted. Specifically, the optical fiber ribbon 20 was torn along its longitudinal direction with a nail inserted between the second colored coated optical fiber 402 and the third colored coated optical fiber 403. As a result, the optical fiber ribbon 20 was divided into two units, that is, a unit of the first and second colored coated optical fibers 401 and 402, and a unit of the third and fourth colored coated optical fibers 403 and 404. Lastly, the single core colored coated optical fiber was taken out. The operation described above was repeated ten times for each kind of sample. In this process, a sample, in which the individual colored coated optical fibers were separated without the collective coating layer 201 broken on the circumference of each of the colored coated optical fiber 401 and the colored coated optical fiber 404 which were the optical fibers at both ends, was evaluated as one satisfying required single core separability. On the other hand, a sample, in which the collective coating layer 201 was broken and resultantly remained on the circumference of the colored coated optical fiber 401 or the colored coated optical fiber 404 even once in ten times of the testing, was evaluated as one not satisfying the required single core separability.

Next, a water resistance of the optical fiber ribbon was measured by using the optical fiber ribbon 20 fabricated as illustrated in FIG. 2. The water resistance of the optical fiber ribbon 20 was measured in such a way that the optical fiber ribbon 20 having a length of 1 km was soaked in hot water at 60° C., and the transmission loss after the soaking was measured. The measurement of the transmission loss was made by evaluating an optical backscatter loss coefficient (OTDR) by means of an optical time domain reflectometer MW9076 made by ANRITSU CORPORATION. The wavelength of a transmission signal was set to 1.55 µm. In this measurement method, the transmission loss of the optical fiber ribbon 20 before soaking was measured, then the transmission loss thereof was measured in the same manner after the soaking in hot water at 60° C. for 60 days, and the transmission losses before and after the soaking were compared for evaluation. Here, when the transmission loss of the optical fiber ribbon 20 was increased by 0.05 dB/km or more, the optical fiber ribbon 20 was determined as having inter-layer separation between the collective coating layer 201 and the colored layer 107. Accordingly, an optical fiber ribbon 20 having a transmission loss increased by 0.05 dB/km or more after the measurement was evaluated as not satisfying the water resistance under a use environment.

The foregoing measurements were made on the 8 kinds of samples described above. Table 1 presents the measurement results of these samples.

TABLE 1

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Colorant | C1 | C2 | C3 | C4 | C1 | C2 | C3 | C4 |
| Young's modulus in tension (MPa) | 900 | 1000 | 1050 | 1100 | 885 | 900 | 885 | 1200 |
| Equilibrium elastic modulus (MPa) | 17 | 20 | 15 | 12 | 28 | 28 | 28 | 30 |

TABLE 1-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Yield point elongation (%) | 5 | 9 | 8 | 9 | 3 | 3 | 3 | 5 |
| Glass transition temperature (° C.) | 114 | 109 | 100 | 105 | 120 | 122 | 120 | 125 |
| Adhesion (N/cm) | 13.7 | 14.0 | 12.0 | 15.0 | 15.0 | 14.1 | 15.5 | 20.0 |
| Evaluation on single core separability | ○ | ○ | ○ | ○ | × | × | × | × |
| Evaluation on warm water soaking | ○ | ○ | ○ | ○ | ○ | ○ | ○ | × |

Note:
"○" means a good result, and "×" means a bad result.

From the experiment results presented in Table 1, it can be understood, based on characteristics of yield point elongation and toughness, that the collective coating layer 201 of the present invention in which the molecular weight of the PPG and the monomer as the additive are adjusted achieves high resistance to breakage of the ribbon material in operation work.

Example 1 was made to have a lower equilibrium elastic modulus, a larger yield point elongation, a lower glass transition temperature, and a lower adhesion than Comparative Example 1, and thereby achieved both the single core separability and the hot water property.

Example 2 was made to have a lower equilibrium elastic modulus, a larger yield point elongation, and a lower glass transition temperature than Comparative Example 2, and thereby achieved both the single core separability and the hot water property.

Example 3 was made to have a lower equilibrium elastic modulus, a larger yield point elongation, a lower glass transition temperature, and a lower adhesion than Comparative Example 3, and thereby achieved both the single core separability and the hot water property.

Example 4 was made to have a lower equilibrium elastic modulus, a larger yield point elongation, a lower glass transition temperature, and a lower adhesion than Comparative Example 4, and thereby achieved both the single core separability and the hot water property.

Further, from the results of the evaluation on single core separability and the evaluation on hot water soaking presented in Table 1, it can be ascertained that the collective coating layers 201 of the present invention containing the PPG and presented in Table 1 can achieve both of the favorable single core separability and water resistance, even if any kinds of colorants are used. In other words, it is possible to inhibit crystallization by using the amorphous PPG and the amorphous monomer as the additive and to optimize the adhesion between the colored layer 107 and the collective coating layer 201 by adjusting the molecular weight of the PPG and the ratio of functional groups in the amorphous monomer.

According to the present embodiment, it is possible to provide an optical fiber ribbon which achieves both favorable transmission characteristics with a small transmission loss under the use environment, and favorable workability in installations. In a conventional optical fiber ribbon, there has been a concern about crystallization of the ribbon material due to an unreacted part thereof under a low temperature environment. In addition, there has also been a concern of a significant increase in the transmission loss due to inter-layer separation at an interface with the coated optical fibers. In contrast, in an optical fiber ribbon of the present embodiment, use of amorphous PPG for a ribbon material may completely inhibit crystallization of the ribbon material, and therefore both the favorable single core separability and workability can be achieved. Moreover, according to the present embodiment, the adjustment of the molecular weight of the PPG and the ratio of functional groups in the amorphous monomer enables the optical fiber ribbon to achieve characteristics comparable to those of the conventional optical fiber ribbon.

The invention claimed is:

1. An optical fiber ribbon comprising:
    a plurality of coated optical fibers; and
    a collective coating layer containing an ultraviolet curable resin containing amorphous polypropylene glycol in the form of an oligomer, the collective coating layer formed around the coated optical fibers, wherein
    the collective coating layer has an equilibrium elastic modulus of 12 MPa to 20 MPa, both inclusive, and a yield point elongation of 5% to 9%, both inclusive, and an adhesion between the collective coating layer and outermost layers of the coated optical fibers is 12 N/cm to 15 N/cm, both inclusive.

2. An optical fiber cable comprising an optical fiber ribbon according to claim 1.

* * * * *